(12) United States Patent
Isobe et al.

(10) Patent No.: US 10,710,300 B2
(45) Date of Patent: Jul. 14, 2020

(54) INFORMATION PROCESSING APPARATUS, THREE-DIMENSIONAL MODELING SYSTEM, AND COMPUTER READABLE MEDIUM STORING INFORMATION PROCESSING PROGRAM

(71) Applicant: FUJI XEROX CO., LTD., Tokyo (JP)

(72) Inventors: Kimihiko Isobe, Kanagawa (JP); Mamoru Mochizuki, Kanagawa (JP); Kenichirou Hotokeishi, Kanagawa (JP); Takashi Kikumoto, Kanagawa (JP); Jun Wakamatsu, Kanagawa (JP); Kazuhiro Ohkawa, Kanagawa (JP); Masaharu Tonouchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 85 days.

(21) Appl. No.: 15/726,757

(22) Filed: Oct. 6, 2017

(65) Prior Publication Data

US 2018/0200949 A1    Jul. 19, 2018

(30) Foreign Application Priority Data

Jan. 18, 2017  (JP) .................. 2017-007072

(51) Int. Cl.
*B29C 64/147* (2017.01)
*B33Y 50/02* (2015.01)
(Continued)

(52) U.S. Cl.
CPC ............ *B29C 64/147* (2017.08); *B33Y 50/02* (2014.12); *G03G 15/224* (2013.01); *G06T 17/00* (2013.01); *G03G 2221/1696* (2013.01)

(58) Field of Classification Search
CPC ................ B29C 64/147; G03G 15/224; G03G 2221/1696; B33Y 50/02; G06T 17/00
See application file for complete search history.

(56) References Cited

U.S. PATENT DOCUMENTS

| 10,071,527 B2 * | 9/2018 | Travers .................. G05B 15/02 |
| 2007/0146734 A1 * | 6/2007 | Taniuchi ................ B33Y 30/00 |
| | | 358/1.1 |

(Continued)

FOREIGN PATENT DOCUMENTS

JP    2010-240843    10/2010

OTHER PUBLICATIONS

Abstract and machine translation of JP 2010-240843.

*Primary Examiner* — Charles R Kasenge
(74) *Attorney, Agent, or Firm* — Fildes & Outland, P.C.

(57) ABSTRACT

An information processing apparatus includes: a first output unit that, when an instruction to perform image formation based on 2D image data is received, generates first image formation information for formation of images on respective recording media based on the 2D image data and outputs the generated first image formation information to an image forming apparatus; a second output unit that, when an instruction to perform 3D modeling based on 3D data is received, generates plural slice data by slicing the 3D data by plural respective planes, generates second image formation information for formation of a series of slice images on respective recording media based on the plural generated slice data, and outputs the generated second image formation information to the image forming apparatus; a generation unit that generates a series of control data as defined herein; and a storing unit as defined herein.

5 Claims, 10 Drawing Sheets (51) Int. Cl.
*G06T 17/00* (2006.01)
*G03G 15/22* (2006.01)

(56) References Cited

U.S. PATENT DOCUMENTS

| | | | |
|---|---|---|---|
| 2011/0222081 A1* | 9/2011 | Yi | G06T 17/00 |
| | | | 358/1.9 |
| 2015/0251351 A1* | 9/2015 | Feygin | B33Y 30/00 |
| | | | 156/267 |
| 2016/0009069 A1* | 1/2016 | Mou | B32B 38/145 |
| | | | 216/52 |
| 2017/0001371 A1* | 1/2017 | Sobue | B29C 64/141 |
| 2017/0001381 A1* | 1/2017 | Suzuki | G03G 15/1625 |
| 2017/0042501 A1* | 2/2017 | Jahnke | G01R 33/58 |
| 2017/0144426 A1* | 5/2017 | Moore | B29C 64/188 |
| 2018/0162045 A1* | 6/2018 | Guimbretiere | B29C 64/223 |
| 2018/0186068 A1* | 7/2018 | MacCormack | B29C 64/141 |
| 2018/0192986 A1* | 7/2018 | Jahnke | G01R 33/58 |

\* cited by examiner

INFORMATION PROCESSING APPARATUS, THREE-DIMENSIONAL MODELING SYSTEM, AND COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2017-007072 filed on Jan. 18, 2017.

BACKGROUND

Technical Field

The present invention relates to an information processing apparatus, a three-dimensional modeling system, and a computer readable medium storing an information processing program.

SUMMARY

According to an aspect of the invention, there is provided an information processing apparatus comprising: a first output, unit that, when art instruction to perform image formation based on 2D image data is received, generates first image formation information for formation of images on respective recording media based on the 2D image data and outputs the generated first image formation information to an image forming apparatus; a second output, unit that, when an instruction to perform 3D modeling based on 3D data is received, generates plural slice data by slicing the 3D data by plural respective planes, generates second image formation information for formation of a series of slice images on respective recording media based on the plural generated slice data, and outputs the generated second image formation information to the image forming apparatus; a generation unit that generates a series of control data that allow a post-processing apparatus to perform 3D modeling post-processing on the recording media, based on the plural slice data; and a storing unit that stores the generated series of control data in a memory.

BRIEF DESCRIPTION OF THE DRAWINGS

Exemplary embodiment of the present invention will foe described in detail based on the following figures, wherein.

DESCRIPTION OF SYMBOLS

10: Information processing apparatus
12: Image Forming apparatus
14: 3D modeling post-processing apparatus (post-processing apparatus)
16: Storing mechanism
18: Communication line
20: Glue applying unit
22: Cutting-out unit
24: Compression bonding unit
26: Conveyance path
30: Information processing unit
40: File format conversion unit
42: Raster processing unit
44: 3D data processing unit
45: Slice processing unit
46: Image data generation unit
47: Control data generation unit
48: Control data memory
50: Recording medium
52: Lamination component
53: Unnecessary portion
54: Cutting line
56: Colored region
58: Glue application region
D: Removal target
M: 3D model
Mn: Slice image
P: 3D modeled object

DETAILED DESCRIPTION

An exemplary embodiment of the present invention will be hereinafter described in detail with reference to the drawings.

Three-Dimensional Modeling System
(Overall Configuration)

First, a three-dimensional (3D) modeling system according to the exemplary embodiment of the invention will be described. The 3D modeling system according to the exemplary embodiment manufactures a three-dimensional (3D) modeled object by a sheet lamination 3D modeling method. In the sheet lamination 3D modeling method, plural pieces of slice data are generated by slicing three-dimensional (3D) data of a 3D model by plural planes and a series of slice images is formed on plural sheet-like recording media such as paper sheets on the basis of the plural pieces of slice data. Then 3D modeling post-processing is performed on the plural recording media on which the series of slice images is formed; for example, the plural recording media are laminated by subjecting them to certain processing. How to generate slice data will be described later. The term "series of slice images" means that the slice images correspond to the respective pieces of slice data generated on the basis of the 3D data.

Figure 1A:
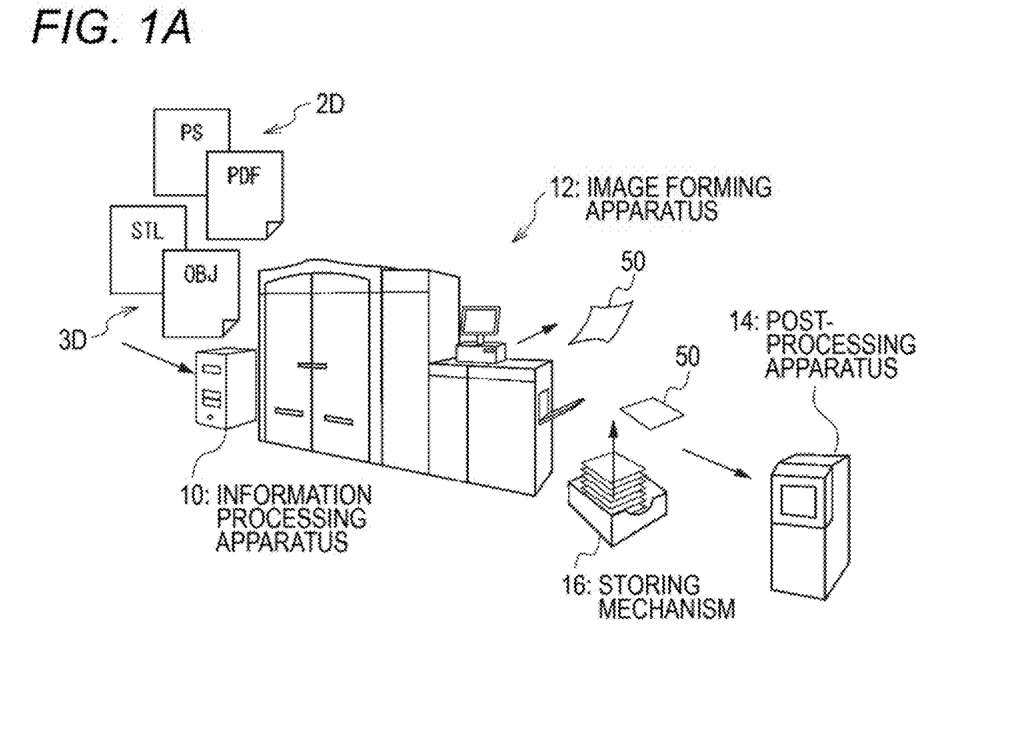
FIGS. 1A and 1B are a schematic diagram and a block diagram, respectively, illustrating the configuration of one example 3D modeling system according to an exemplary embodiment of the present invention.
Figure 1B:
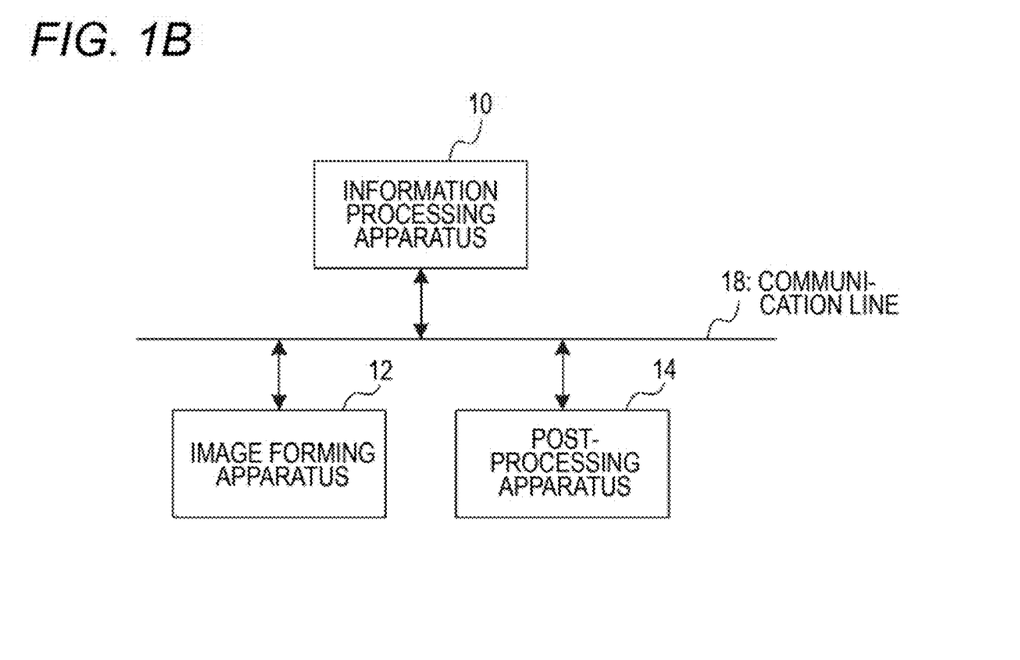
Figure 2:
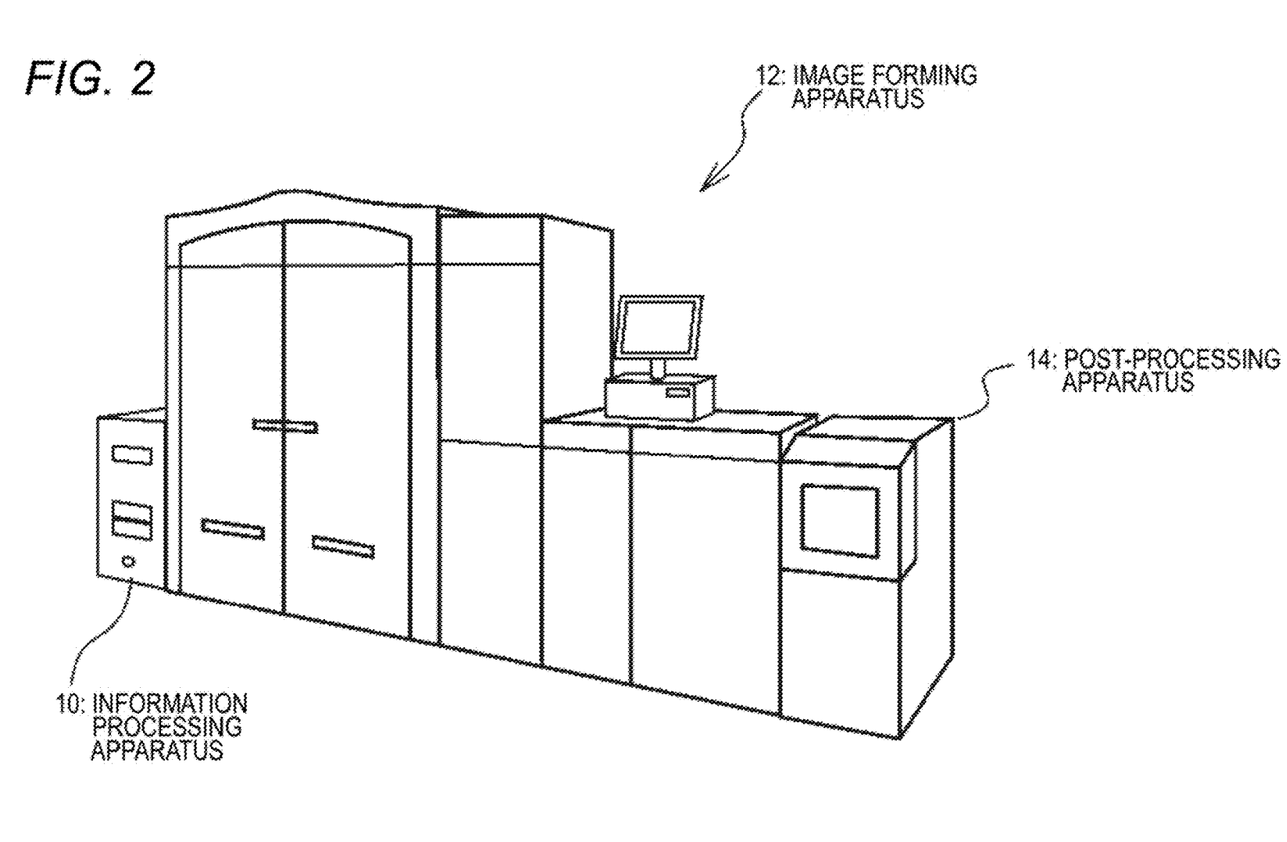
FIG. 2 is a schematic diagram showing the configuration of another example 3D modeling system according to the exemplary embodiment.

FIGS. 1A and 1B are a schematic diagram and a block diagram, respectively, illustrating the configuration of one example 3D modeling system according to the exemplary embodiment. FIG. 2 is a schematic diagram showing the configuration of another example 3D modeling system according to the exemplary embodiment.

As shown in FIG. 1A, the one example 3D modeling system according to the exemplary embodiment is equipped with an information processing apparatus 10, an image forming apparatus 12, and a 3D modeling post-processing apparatus 14. As shown in FIG. 1E, the information processing apparatus 10, the image forming apparatus 12, and the 3D modeling post-processing apparatus 14 are connected to each other so as to be able to communicate with each other through a communication line 18. In the following description, the 3D modeling post-processing apparatus 14 will be abbreviated as a "post-processing apparatus 14."

The image forming apparatus 12 forms an image on a recording medium 50 on the basis of raster image data. The raster image data, are an example of the "image formation information". In the exemplary embodiment, the image forming apparatus 12 is not an apparatus dedicated to 3D modeling. The image forming apparatus 12 functions as an ordinary image forming apparatus when it is instructed to perform image formation base on two-dimensional (2D) image data. As such, the information processing apparatus 10 performs different kinds of information processing depending on which of image formation based on 2D image data and 3D modeling based on 3D data it should work for.

The image forming apparatus 12 is an apparatus for forming an image on a recording medium by electrophotography, for example. In this case, the image forming apparatus 12 includes a photoreceptor drum, a charging device, an exposing device, a developing device, a transfer device, a fusing device, etc. The charging device charges the photoreceptor drum. The exposing device exposes the charged surface of the photoreceptor drum to light that reflects an image to be formed. The developing device develops, with toner, an electrostatic latent image formed on the photoreceptor drum by the exposure. The transfer device transfers a toner image formed on the photoreceptor drum by exposure to a recording medium. The fusing device fuses the toner image transferred to the recording medium. The image forming apparatus 12 may be an inkjet recording apparatus, in which case the image forming apparatus 12 includes an inkjet recording head for ejecting ink droplets toward a recording medium according to an image to be formed and other components.

If instructed to work for 3D modeling based on 3D data, the information processing apparatus 10 generates plural pieces of slice data on the basis of the 3D data. Then, to enable formation of a series of raster images, the information processing apparatus 10 generates a series of raster image data on the basis of the plural pieces of slice data and outputs the generated series of raster image data to the image forming apparatus 12. On the other hand, if instructed to work for image formation based on 2D image data, the information processing apparatus 10 generates raster image data on the basis of the 2D image data and outputs the generated raster image data of a 2D image to the image forming apparatus 12.

If instructed to work for 3D modeling based on 3D data, the information processing apparatus 10 further generates a series of control data on the basis of the plural pieces of slice data. The series of control data is data for allowing the post-processing apparatus 14 to perform 3D modeling post-processing. As described later, control data include control data that specify a cutting line along which to cut out a lamination component from a recording medium and control data that specify a glue application region where glue is applied to the recording medium.

The post-processing apparatus 14 performs 3D modeling post-processing on recording media 50 on which a series of slice images are formed. As shown in FIG. 1A, the post-processing apparatus 14 may be disposed so as not to share a recording medium conveyance path with the image forming apparatus 12 (offline; or near-line). Alternatively, as shown in FIG. 2, the post-processing apparatus 14 may be disposed so as to share a recording medium conveyance path with the image forming apparatus 12 (in-line).

Where the post-processing apparatus 14 does not share a conveyance path with the image forming apparatus 12, plural recording media 50 on which a series of slice images is formed are stacked in order of formation of the slice images and stored in a storing mechanism 16 such as a stacker. The bundle of (i.e., stacked) plural recording media 50 is taken out of the storing mechanism 16 and transferred to the post-processing apparatus 14 together. On the other hand, where the post-processing apparatus 14 shares a conveyance path with the image forming apparatus 12, recording media 50 on which respective slice images are formed are fed to the post-processing apparatus 14 one by one.

(Sheet Lamination 3D Modeling)

Figure 3A:
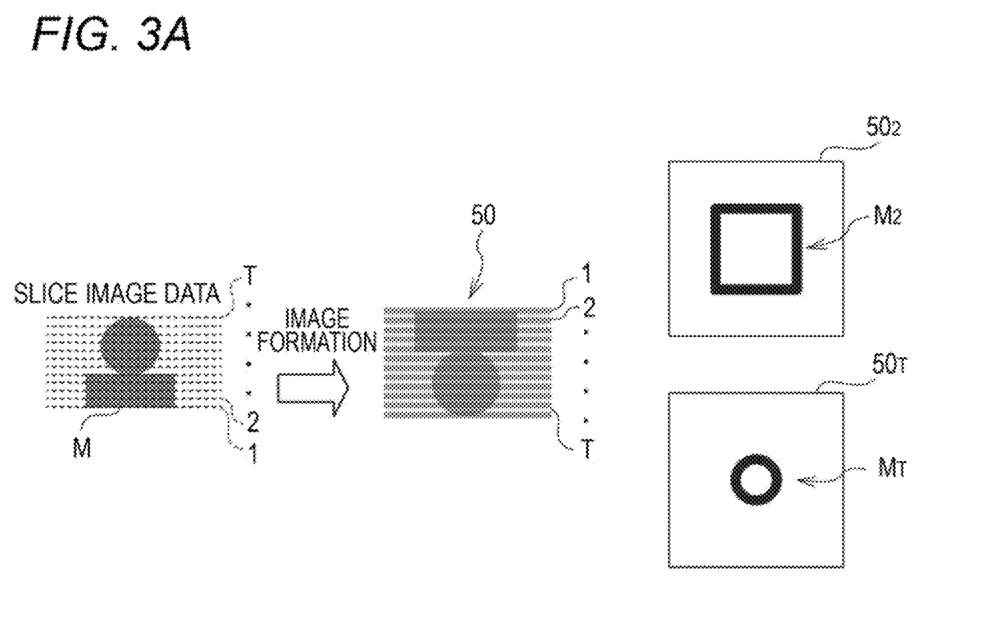
FIG. 3A is a schematic diagram illustrating an image forming process of sheet lamination 3D modeling.
Figure 3B:
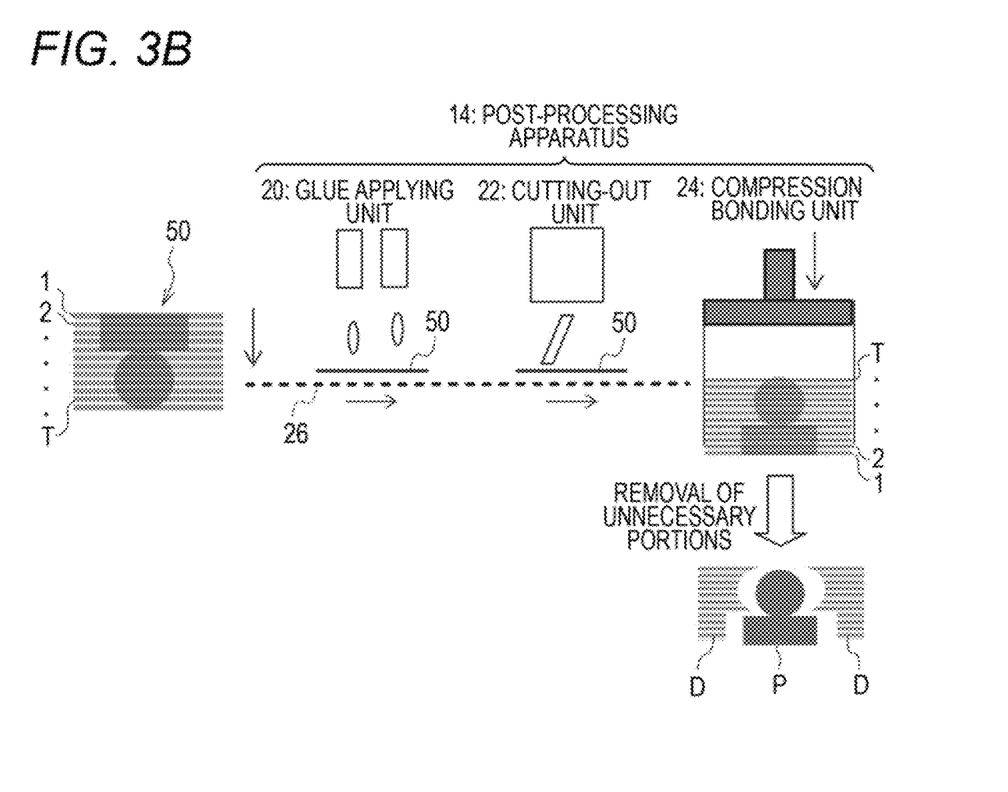
FIG. 3B is a schematic diagram illustrating a post-processing process of the sheet lamination 3D modeling.

Next, individual processes of sheet lamination 3D modeling will be described. FIG. 3A is a schematic diagram illustrating an image forming process of the sheet lamination 3D modeling, and FIG. 3B is a schematic diagram illustrating a post-processing process of the sheet lamination 3D modeling.

First, raster image data of slice images are generated as shown in FIG. 3A. Although the details will be described later, the information processing apparatus 10 generates plural pieces of slice data on the basis of 3D data of a 3D model M. The slice data represent sectional images obtained by slicing the 3D model M by slicing planes. In the exemplary embodiment, T (first to Tth) pieces of slice data are generated using T (first to Tth) slicing planes. Each of the T pieces of slice data is converted into YMCK raster image data for formation of a corresponding one of T (first to Tth) slice images.

Next, as shown in FIG. 3A, slice images are formed on respective recording media. The image forming apparatus 12 forms a series of slice images on recording media 50 on the basis of the series of raster image data. The plural recording media $50_1$ to $50_T$ on which the series of slice images is formed are stacked in order of formation of the slice images. An nth slice image is formed on an nth recording medium $50_n$, n being a number that is one of "1" to "T".

In the illustrated example, the T (first to Tth) slice images are formed in order that the number representing each of them descends from to "T" to "1". The plural recording media $50_1$ to $50_T$ are stacked in order that the number representing each of them descends from "T" to "1" with the recording medium $50_T$ on which the Tth slice image is formed being the lowest layer. Since the plural recording media $50_1$ to $50_T$ are stacked in this order, the post-processing process that follows is supplied with the plural recording media $50_1$ to $50_T$ in order that the number representing each of them ascends from "1" to "T". As such, the image forming apparatus 12 forms T slice images on recording media 50 in the order that is reverse to the order in which the post-processing apparatus 14 performs post-processing.

Subsequently, as shown in FIG. 3B, the recording media 50 on which the respective slice images are formed are subjected to post processing. In the exemplary embodiment, the post-processing apparatus 14 is equipped with a glue applying unit 20 which performs a glue applying operation, a cutting-out unit 22 which performs a cutting-out operation, and a compression bonding unit 24 which performs a compression bonding operation. The glue applying unit 20, the cutting-out unit 22, and the compression bonding unit 24 are arranged in this order along a conveyance path 26 for feeding recording media 50. The post-processing apparatus 14 acquires a series of control data corresponding to the series of slice images from the information processing apparatus 10.

Figure 4A:
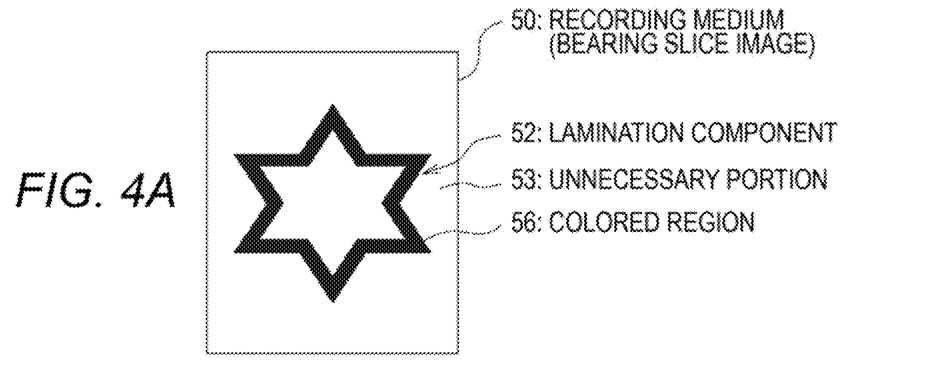
FIGS. 4A, 4B and 4C are schematic diagrams showing a slice image formed on a recording medium.
Figure 4B:
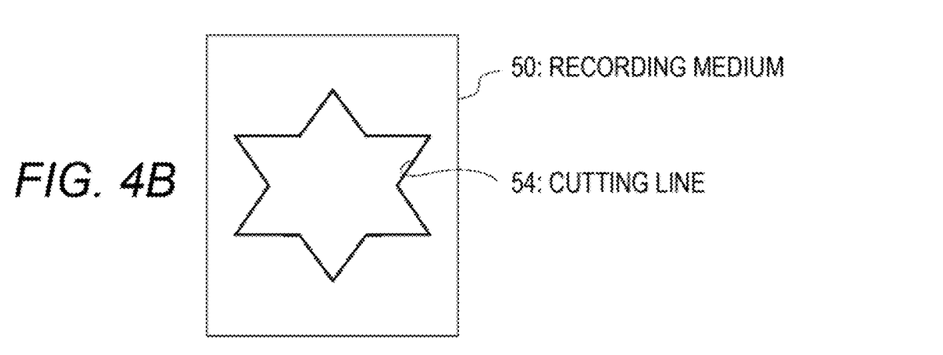
Figure 4C:
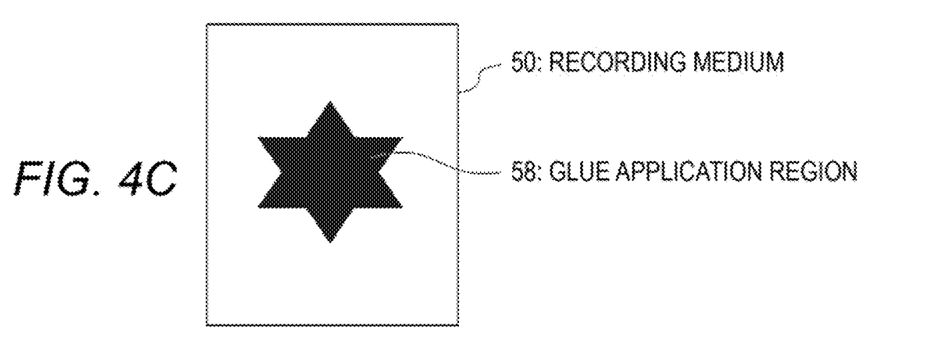

The slice image will now be described. FIGS. 4A-4C are schematic diagrams showing an example slice image formed on a recording medium 50. As shown in FIG. 4A, a slice image formed on a recording medium 50 consists of a lamination component 52 to become part of a 3D modeled object when subjected to lamination and an unnecessary portion 53. The lamination component 52 has a colored region 56 which is a peripheral region having a preset width. As shown in FIG. 4B, the outer circumferential line of the lamination component 52 is a cutting line 54 along which to cut out the lamination component 52 from the recording medium 50.

As shown in FIG. 4C, a glue application region 58 is set inside the outer circumferential line (cutting line 54) of the lamination component 52; for example, the glue application region 58 is the region located inside and adjoining the colored region 56. Although glue may be applied to the entire surface of the recording medium 50 including the unnecessary portion 53, setting the glue application region 58 as a region located inside the outer circumferential line of the lamination component 52 makes it easier to remove removal target portions D (see FIG. 3B) than in the case that glue is applied to the entire surface of the recording medium 50. Furthermore, setting the glue application region 58 as a region located inside the outer circumferential line of the lamination component 52 prevents an event, that, glue sticks out of the lamination component 52 in a compression bonding operation that is performed after glue application.

A width of the colored region 56 and a retreat width of the glue application region 58 from the outer circumferential line of the lamination component 52 may be set when a user inputs instructions about 3D modeling by, for example, displaying a setting picture on a display 34 of the information processing apparatus 10 and receiving settings from the user through an operation unit 32. Alternatively, preset initial settings may be employed.

Control data include control data that specify the cutting line 54 and control data that specify the glue application region 58. For example, the control data that specify the cutting line 54 are coordinate data of points located on a route of the cutting line 54. The control data that specify the glue application region 58 are coordinate data of points existing in the glue application region 58.

Recording media 50 are supplied to the glue applying unit 20 one by one from a bundle of plural recording media 50. The glue applying unit 20 applies glue to the glue application region 58 of each recording medium 50 according to control data that specify the glue application region 58. For example, the glue applying unit 20 may be equipped with a glue ejection head for ejecting glue, which is moved in a lamination direction (Z direction) and directions parallel with the plane of the recording medium 50 (X and Y directions). Glue is applied to the glue application region 58 of the recording medium 50 as the glue ejection head scans the glue application region 58 while ejecting glue. Upon completion of the glue applying operation, the recording medium 50 is supplied to the cutting-out unit 22.

The cutting-out unit 22 forms a cut in each recording medium 50 along the cutting line 54 according to control data that specify the cutting line 54. For example, the cutting-out unit 22 may be a cutter having a blade. The blade of the cutter is moved in the lamination direction (Z direction) and the directions parallel with the plane of the recording medium 50 (X and Y directions). A cut is formed in the recording medium 50 by moving the blade of the cutter in the X and Y directions while pressing it against the recording medium 50.

A cutting depth is determined by adjusting the position of the blade of the cutter in the lamination direction. The cutting depth may be such that the cut does not reach the back surface of each recording medium 50, in which case the lamination component 52 is not separated from the recording medium 50 and hence can be prevented from being lost in the process of conveyance of the recording medium 50.

It suffices that the cutter have a function of forming a cut along the cutting line 54 of a recording medium 50, and the cutter is not limited to a mechanical cutter that presses a blade against a recording medium 50. For example, the cutter may be an ultrasonic cutter that forms a cut by applying ultrasonic waves to a recording medium 50 or a laser cutter that forms a cut by irradiating a recording medium 50 with laser light.

Instead of forming a cut in a recording medium 50, the cutting-out unit 22 may form plural perforations in a recording medium 50 along the cutting line 54. Where plural perforations are formed, the lamination component 52 is kept connected to the recording medium 50 and hence can be prevented from being lost in the process of conveyance of the recording medium 50 even more reliably.

Each recording medium 50 that has been subjected to the cutting operation is supplied to the compression bonding unit 24. The compression bonding unit 24 stacks received recording media 50 successively. The plural recording media $50_1$ to $50_T$ are stacked in order that the number representing each of them ascends from "1" to "T". The compression bonding unit 24 compression-bonds the bundle of stacked plural recording media 50 together by pressing it in the lamination direction. During the pressure bonding, each of the plural glue-applied recording media $50_1$ to $50_T$ is bonded to the recording media 50 located immediately above and below in the glue application regions 58.

The recording media 50 that have been subjected to the cutting-out operation are composed of the lamination components 52 that constitute a 3D modeled object P as a result of the lamination and the unnecessary portions 53. In this state, the unnecessary portions 53 are not removed and remain parts of the recording media 50. The unnecessary portions 53 serve as a support member for supporting the 3D modeled object P that is a laminate of the lamination components 52. After completion of the lamination operation of the compression bonding unit 24, removal target portions D are separated from the laminate of the lamination components 52 of the recording media 50, whereby the 3D modeled object P are separated.

Figure 5A:
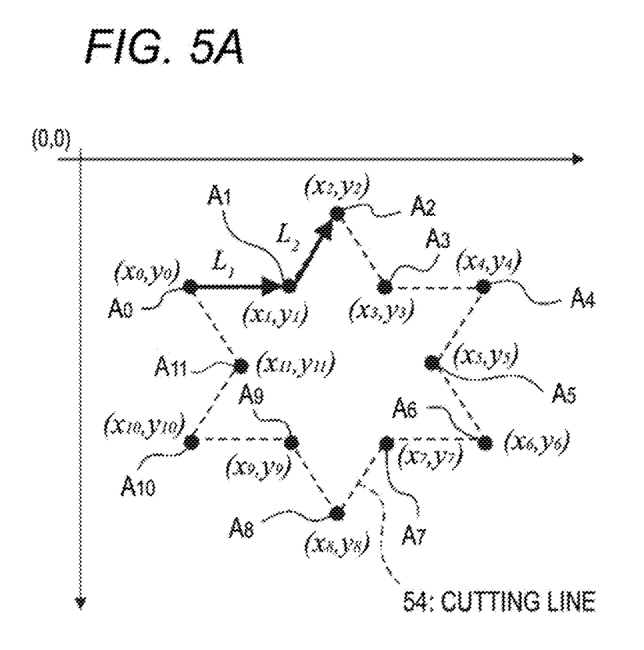
FIGS. 5A and 5B are schematic diagrams illustrating examples of control data that specify a cutting line.
Figure 5B:
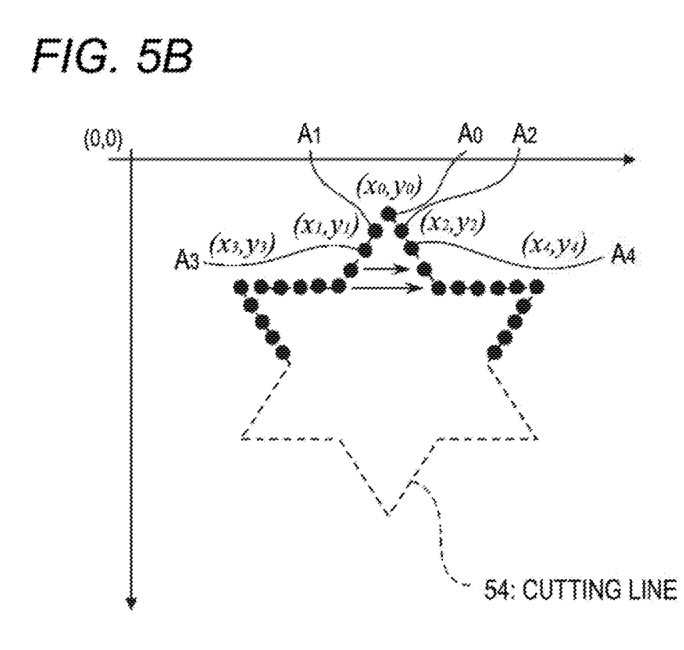
Figure 6A:
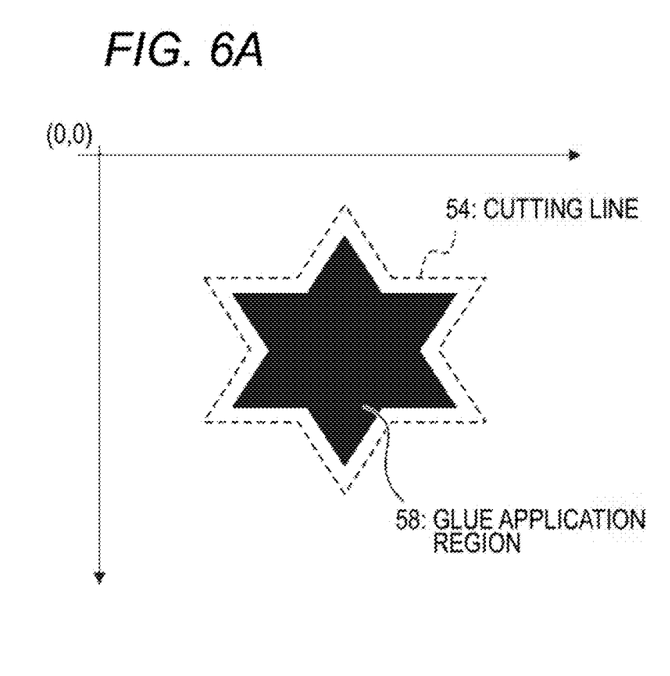
FIGS. 6A and 6B are schematic diagrams illustrating examples of control data that specify a glue application region.
Figure 6B:
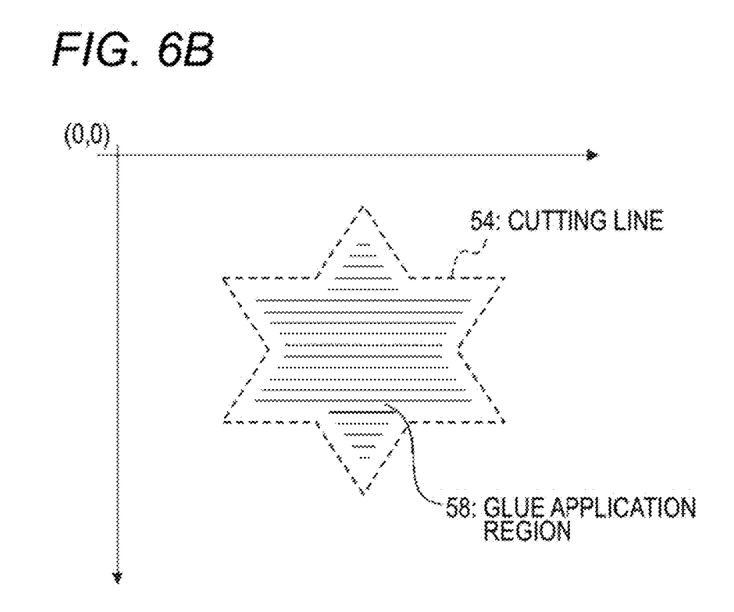

Next, examples of control data will be described. FIGS. 5A and 5B are schematic diagrams illustrating examples of control data that specify a cutting line 54. FIGS. 6A and 6B are schematic diagrams illustrating examples of control data that specify a glue application region 58. As described later, slice data include coordinate data of apices of intersection regions where polygons intersect a slicing plane. The intersection regions exist along the outer circumferential line of a lamination component 52. Thus, as shown in FIG. 5A, coordinate data of respective points located on the route of a cutting line 54, such as coordinates $(x_0, y_0)$ of point $A_0$, are made control data that specify the cutting line 54.

In the illustrated example, a star-shaped lamination component 52 has twelve apices $A_3$ to $A_{11}$. For example, if point $A_0$ is employed as a start point, the cutting line 54 is specified by tracing the points $A_0$ to $A_{11}$ in order of $A_0 \rightarrow A_2 \rightarrow A_3 \rightarrow A_4 \rightarrow A_5 \rightarrow A_6 \rightarrow A_7 \rightarrow A_8 \rightarrow A_9 \rightarrow A_{10} \rightarrow A_{11}$.

As shown in FIG. 5B, where plural perforations are to be formed, coordinate data of respective perforations located on the route of a cutting line 54 are made control data that specify the cutting line 54. For example, if point $A_0$ is employed as a start point, the cutting line 54 is specified by tracing points of the perforations in order of their formation (e.g., $A_0 \rightarrow A_2 \rightarrow A_3 \rightarrow A_4$ ...).

As shown in FIG. 6A, coordinate data of respective points of a glue application region 58 are made control data that specify the glue application region 58. The glue application region 58 is one size smaller than the lamination component 52 and is set inside the outer circumferential line of the lamination component 52. A glue application region 58 may be specified by reducing the image of the lamination component 52. In this case, the glue application region 58 is disposed so that its center of gravity coincides with that of the image of the lamination component 52. Coordinate data of respective points of the glue application region 53 are determined on the basis of its retreat width from the outer circumferential line of the lamination component 52 and coordinate data of points located on the route of the cutting line 54.

As shown in FIG. 6B, it is not necessary to apply glue over the entire glue application region 58. Glue may be applied in selected portions of the glue application region 58. Furthermore, the glue density need not be constant over the entire glue application region 58. Where the glue density is set variable, the glue density may be set higher in a peripheral region of the glue application region 58 than in its central region.

The origin of control data that specify a cutting line 54 and the origin of control data that specify a glue application region 58 are set the same as the origin of slice image formation. Where the post-processing apparatus 14 has an image reading function, a procedure may be employed that the image forming apparatus 12 forms a mark image indicating the origin of control data on a recording medium 50 together with a slice image and the post-processing apparatus 14 acquires position information indicating the origin of control data by reading the mark image.

The form of control data is not limited to coordinate data. For example, control data may be image data in which a cutting line 54, a glue application region 58, etc. are represented by figures or images, such as binary raster image data. In the case of binary raster image data, in the example shown in FIG. 48, the pixel values of the cutting line 54 are made and those of the other regions are made "0." In the example shown in FIG. 4C, the pixel values of the glue application region 58 are made "1" and those of the other regions are made "0." For example, the glue ejection head of the glue applying unit 20 ejects glue toward a recording medium 50 when the pixel value is equal to "1" and does not eject glue toward the recording medium 50 when the pixel value is equal to "0."

<Information Processing Apparatus 10>

Figure 7:
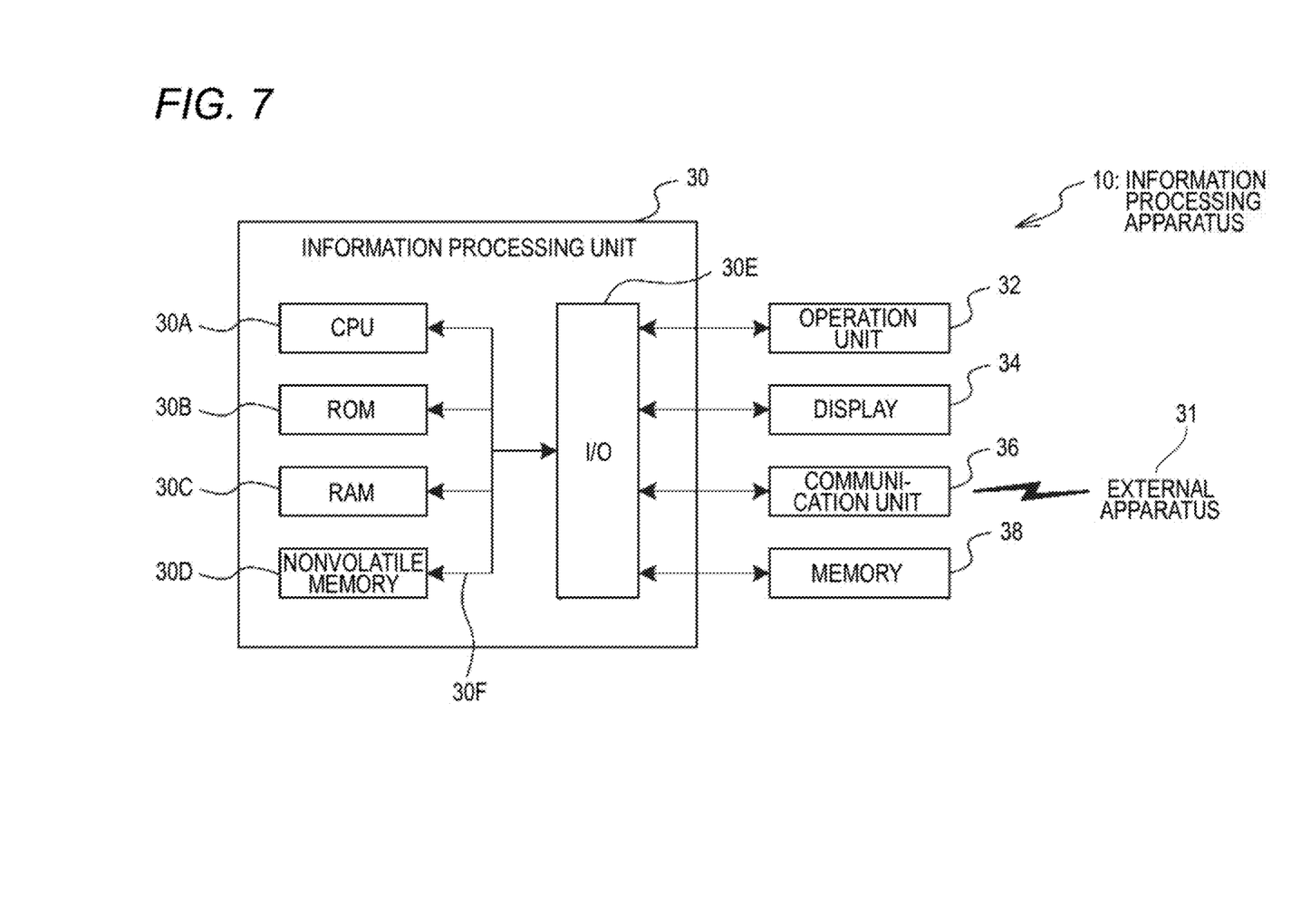
FIG. 7 is a block diagram showing an example electrical configuration of an information processing apparatus according to the exemplary embodiment.

Next, the information processing apparatus 10 according to the exemplary embodiment of the invention will be described. FIG. 7 is a block diagram showing the electrical configuration of the information processing apparatus 10 according to the exemplary embodiment. As shown in FIG. 7, the information processing apparatus 10 is equipped with an information processing unit 30, an operation unit 32 for receiving a user manipulation, a display 34 for displaying information to a user, a communication unit 36 for communicating with an external apparatus 31, and a memory 38 such as an external storage device. The operation unit 32, the display 34, the communication unit 36, and the memory 38 are connected to an input/output interface (I/O) 30E of the information processing unit 30.

The information processing unit 30 is equipped with a CPU (central processing unit) 30A, a ROM (read-only memory) 30B, a RAM (random access memory) 30C, a nonvolatile memory 30D, and the I/O 30E. The CPU 30A, the ROM 30B, the RAM 30C, the nonvolatile memory 30D, and the I/O 30E are connected to each other by a bus 30F. The CPU 30A reads out a program from the ROM 30B and executes the program using the RAM 300 as a working area.

The operation unit 32 receives a user manipulation through a mouse, a keyboard, etc. The display 34 displays various pictures to a user using a display device. The communication unit 36 communicates with the external apparatus 31 through a wired or wireless communicate line. For example, the communication unit 36 functions as an interface for communicating with the external apparatus 31 such as a computer that is connected to a network such as the Internet. The memory 38 is equipped with a storage device such as a hard disk drive.

Figure 8:
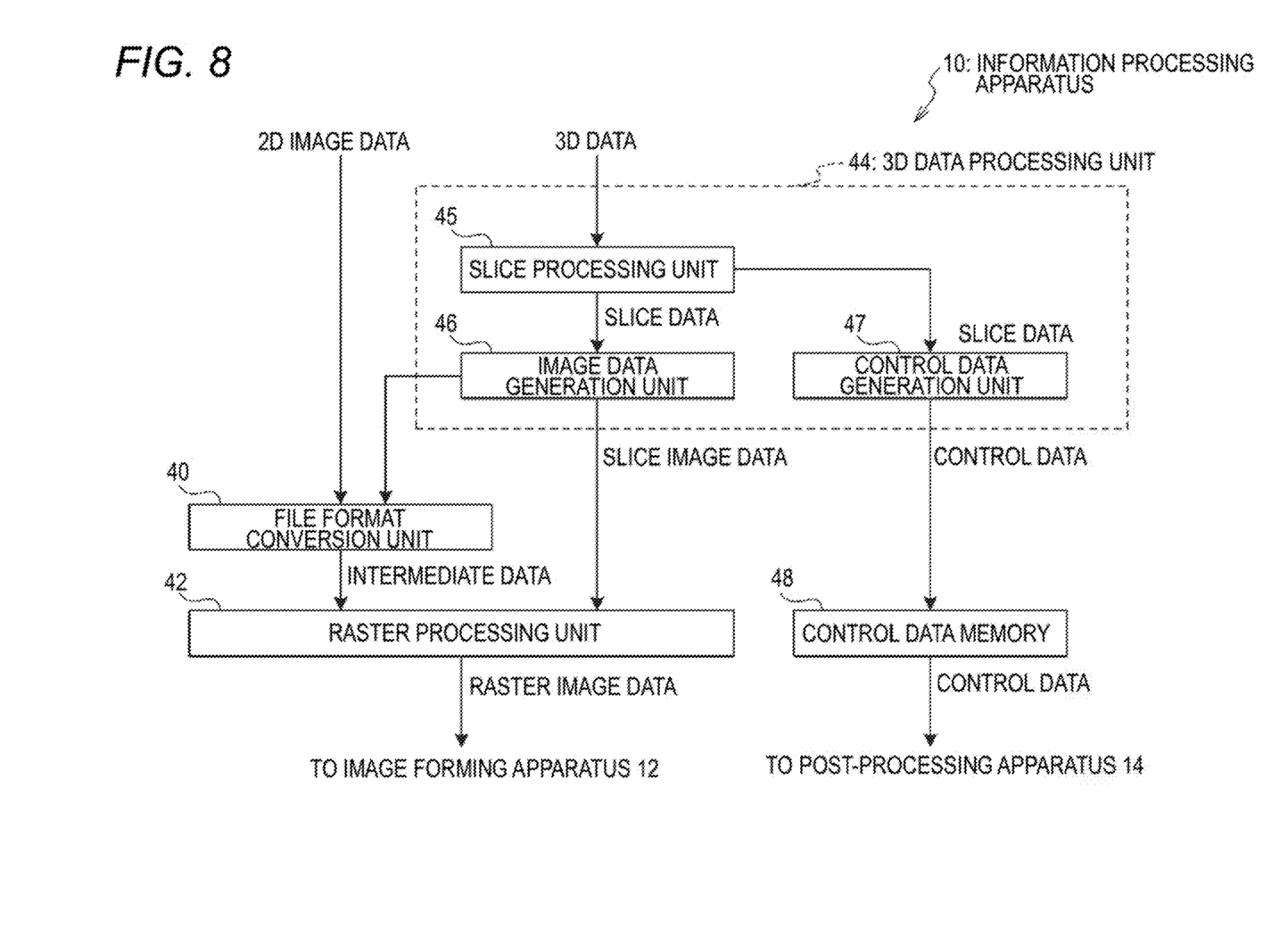
FIG. 8 is a block diagram showing an example functional configuration of the information processing apparatus according to the exemplary embodiment.

FIG. 8 is a block diagram showing the functional configuration of the information processing apparatus 10 according to the exemplary embodiment. As shown in FIG. 8, the information processing apparatus 10 is equipped with a file format conversion unit 40, a raster processing unit 42, a 3D data processing unit 44, and a control data memory 48.

When receiving data written in a page description language (hereinafter referred to as "PDL data"), the file format conversion unit 40 converts the received PDL data into intermediate data.

The raster processing unit 42 generates raster image data by rasterizing the intermediate data produced by the file format conversion unit 40. Furthermore, the raster processing unit 42 generates raster image data by rasterizing slice image data generated by an image data generation unit 46 (described later). The raster processing unit 42 is an example of the "first output unit" and the "second output unit".

The 3D data processing unit 44 generates slice image data and control data by processing received 3D data. More specifically, the 3D data processing unit 44 is equipped with a slice processing unit 45, the image data generation unit 46, and a control data generation unit 47. The slice processing unit 45 generates slice data on the basis of received 3D data. The image data generation unit 46 generates slice image data on the basis of the slice data received from the slice processing unit 45.

The control data generation unit 47 generates control data on the basis of the slice data received from the slice processing unit 45. The control data memory 48 stores the control data received from the control data generation unit 47.

(2D Data Processing)

Two-dimensional data processing on 2D image data will be described below. When image formation based on 2D image data is commanded, the 2D image data are data that have been acquired as PDL data. The PDL data are converted by the file format conversion unit 40 into intermediate data, which are output to the raster processing unit 42. The intermediate data are rasterized by the raster processing unit 42 into raster image data of 2D images, which are output to the image forming apparatus 12.

The intermediate data are interval data produced by dividing each of objects (e.g., font characters, graphic figures, and image data) that are image elements of each page image into intervals of respective raster scanning lines. Each piece of interval data includes sets of coordinates of the two ends of the interval concerned and pieces of information indicating pixel values of respective pixels in the interval. The data transfer rate in the information processing apparatus 10 is increased because the PDL data are converted into the intermediate data and then the latter are transferred.

(3D Data Processing)

Three-dimensional data processing on 3D data will be described below. When 3D modeling based on 3D data is commanded, 3D data of a 3D model M are acquired. The slice processing unit 45 generates slice data on the basis of the 3D data, and outputs the generated slice data to the image data generation unit 46 and the control data generation unit 47. The 3D data and the slice data will be described below in detail.

For example, the 3D data of the 3D model M are OBJ format 3D data (hereinafter referred to as "OBJ data"). In the case of OBJ data, the 3D model M is expressed as a set of polygons (triangles). Alternatively, the 3D data may be of another format such as the STL format. Since STL format 3D data have no color information, color information is added when STL format 3D data are used.

The following description will be directed to the case that the 3D data are OBJ data. The OBJ data include an OBJ file relating to shape data and an MTL file relating to color information. In the OBJ file, surface numbers specific to respective polygons (triangles), coordinate data of the apices of the polygons, etc. are defined so as to be correlated with the respective polygons. In the MTL file, pieces of color information are defined so as to be correlated with the respective polygons.

Planes that are parallel with a ground surface (XY plane) on which the 3D model M is placed are employed as slicing planes. For example, a lowest layer of the 3D model M is set as a first slicing plane. Slice data are generated every time the slicing surface is shifted by a predetermined lamination pitch (distance) p in a lamination direction (Z-axis direction).

The lowest slicing plane is given a number "1" and the slicing plane number is increased by every time the slicing plane is shifted. The example shown in FIG. 3A has T slicing planes having numbers "1" to "T". Slice data represent sectional images obtained by slicing the 3D model M by the slicing planes, respectively. More specifically, each piece of slice data represents a sectional image of the 3D model M in the form of a slicing plane number, coordinate data of the apices of intersection regions where polygons intersect the slicing plane, and pieces of color information that are set for the respective polygons that intersect the slicing plane. T pieces of slice data (first to Tth slice data) are generated by the T respective slicing planes.

The image data generation unit 46 generates slice image data on the basis of the slice data generated by the slice processing unit 45. The slice data are converted into slice image data of a file format such as JPEG. In generating each piece of slice image data, colored regions may be added so as to be reflected in a corresponding slice image. The generated slice image data are output to the raster processing unit 42. The raster processing unit 42 generates raster image data by rasterizing the slice image data generated by the image data generation unit 46, and outputs the generated raster image data to the image forming apparatus 12.

Alternatively, the image data generation unit 46 may be configured so as to cause generation of intermediate data. In this case, the image data generation unit 46 generates PDL data on the basis of the slice data generated by the slice processing unit 45, and outputs the generated PDL data to the file format conversion unit 40. The file format conversion unit 40 converts the PDL data into intermediate data, and outputs the intermediate data to the raster processing unit 42. The raster processing unit 42 generates raster image data of a slice image fey rasterizing the intermediate data, and outputs the generated raster image data to the image forming apparatus 12.

The control data generation unit 47 generates control data on the basis of the slice data generated by the slice processing unit 45. The generated control data are stored in the control data memory 48 so as to be correlated with respective slice image numbers (which are the same as the respective slicing plane numbers). The control data are read out from the control data memory 48 and output to the post-processing apparatus 14 upon reception of a post-processing start instruction from a user.

Although in the exemplary embodiment the information processing apparatus 10 is equipped with the control data memory 48, a memory for storing control data may be disposed outside the information processing apparatus 10. For example, the post-processing apparatus 14 may be equipped with a memory for storing control data. In this case, the control data generated by the information processing apparatus 10 are stored in the memory of the post-processing apparatus 14 and read out from it when used.

The memory for storing control data may be a computer-readable, portable storage medium such as a USB (Universal Serial Bus) memory. In this case, control data generated by the information processing apparatus 10 are stored in the computer-readable, portable storage medium. The control data stored in this storage medium are read out from it by a data reading mechanism such as a drive provided in the information processing apparatus 10 or the post-processing apparatus 14 and used in the post-processing apparatus 14.

<Information Processing Program>

Figure 9:
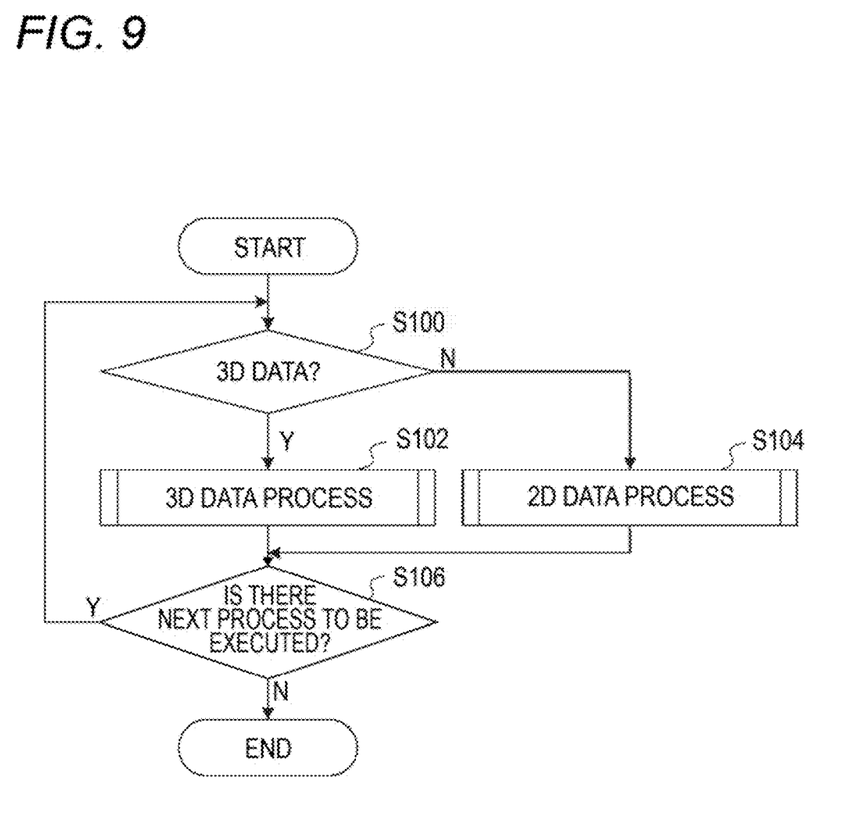
FIG. 9 is a flowchart showing an example processing procedure of an information processing program according to the exemplary embodiment.

Next, an information processing program according to the exemplary embodiment will be described. FIG. 9 is a flowchart showing an example processing procedure of the information processing program according to the exemplary embodiment. The information processing program is stored in the ROM 30B of the information processing apparatus 10. The information processing program is read out from the ROM 30B and executed by the GPU 30A of the information processing apparatus 10. Execution of the information processing program is started upon reception of an image formation instruction or a 3D modeling instruction from a user.

Although the exemplary embodiment is directed to the case that the information processing program is stored in the ROM 30B of the information processing apparatus 10 in advance, the invention is not limited to this case. For example, the information processing program may be provided being stored in a computer-readable, portable storage medium such as a magneto-optical disc, a CD-ROM (compact disc-read only memory), or a USB memory or provided over a network.

First, at step S100, the CPU 30A judges whether data relating to an instruction are 3D data. If 3D modeling based on 3D data is commanded, the CPU 30A executes the process shown in S102. If not, the CPU 30A executes the process shown in S104, that is, performs the above-described 2D data processing.

At step S106, the CPU 30A judges whether there is a next process to be executed. If receiving an instruction to perform 2D image formation or 3D modeling during execution of the 3D data processing or 2D data processing, the CPU 30A executes the process shown in S100 (steps S100-S106 are executed again) because there is a next process to be executed. If judging at step S106 that there is no next process to be executed, the CPU 30A finishes the execution of the information processing program.

<Main Operation of 3D Modeling System>

Figure 10:
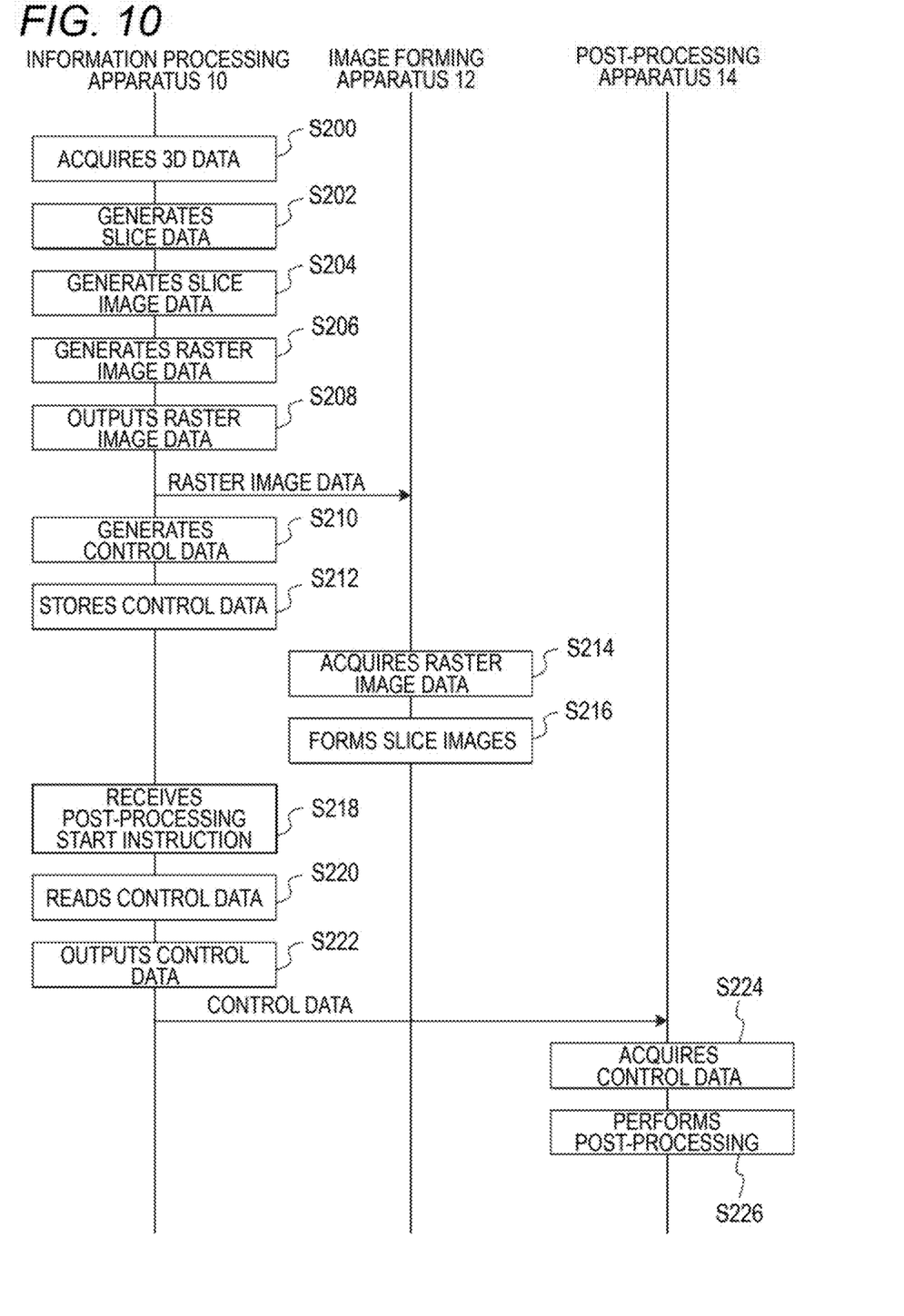
FIG. 10 is a sequence diagram illustrating a main operation of the 3D modeling system according to the exemplary embodiment.

A main operation of the 3D modeling system according to the exemplary embodiment will now be described. FIG. 10 is a sequence diagram illustrating a main operation of the 3D modeling system according to the exemplary embodiment.

As shown in FIG. 10, upon receiving 3D data at step S200, at step S202 the information processing apparatus 10 generates a series of slice data on the basis of the received 3D data.

At step S204, the information processing apparatus 10 generates a series of slice image data on the basis of the series of slice data. The information processing apparatus 10 generates a series of raster image data on the basis of the series of slice image data at step S206, and outputs the generated series of raster image data to the image forming apparatus 12 at step S208.

The information processing apparatus 10 generates a series of control data on the basis of the series of slice data at step S210, and stores the generated series of control data to the memory at step S212. The information processing apparatus 10 may output the raster image data to the image forming apparatus 12 after the generation and storage of the control data.

The image forming apparatus 12 acquires the series of raster image data at step S214, and forms a series of slice images on respective recording media 50 on the basis of the acquired series of raster image data at step S216. The plural recording media 50 on which the series of slice images has been formed are stacked in order of formation of the slice images and stored in the storing mechanism such as a stacker.

Upon receiving a post-processing start instruction from a user at step S218, the information, processing apparatus 10 reads out the series of control data from the memory at step S220 and outputs the read-out series of control data to the post-processing apparatus 14 at step S222.

The post-processing apparatus 14 acquires the series of control data at step S224, and, at step S226, performs post-processing on the plural recording media 50 on which the respective slice images are formed.

A bundle of recording media 50 on which the series of slice images is formed and that are stacked in order of formation of the slice images is set in the post-processing apparatus 14. The post-processing apparatus 14 performs post-processing while taking out the recording media 50 one by one in order from the top in their stacking direction. That is, the plural recording media 50 are subjected to glue application and cutting-out processing and then stacked on each other. The plural stacked recording media 50 are subjected to compression bonding. Finally, removal target portions D are removed, whereby a 3D modeled object P is obtained (see FIG. 3B).

If post-processing were started in the midst of formation of a series of slice images, the order of post-processing on recording media 50 would become erroneous. To perform post-processing in correct order from the top of stacked recording media 50 in their stacking direction, an appropriate operation is to start post-processing after completion of formation of a series of slice images. This makes it easier to correlate the slice images with the control data than in a case that post-processing is started in the midst of formation of a series of slice images.

In the image forming apparatus 12, high-speed processing of several hundred pages per minute, for example, is possible. On the other hand, the processing speed (lamination rate) of the post-processing apparatus 14 is as very low as about several millimeters per hour. Thus, the processing speed of the overall process to manufacture of a 3D modeled object is limited by the processing speed of the post-processing apparatus 14. If control data were generated according to the processing speed of the post-processing apparatus 14, the information processing apparatus 10 could not perform other processing such as rasterization of 2D image data during the generation of control data. This means reduction of the processing ability of the image forming apparatus 12.

In contrast, in the exemplary embodiment, a series of control data is stored in the memory in advance and hence can be read out from it in performing post-processing. As a result, the process of forming slice images on recording media 50 and the process that the post-processing apparatus 14 performs 3D modeling post-processing on the recording media 50 can be isolated from, each other. Thus, the processing ability of each apparatus is made higher than in a case that a series of control data is not stored in a memory.

The information processing apparatus 10 generates control data irrespective of post-processing of the post-processing apparatus 14. The image forming apparatus 12 forms slice images on respective recording media 50 irrespective of post-processing of the post-processing apparatus 14. And the image forming apparatus 12 may perform another kind of image formation processing before a start of post-processing on recording media 50 that are formed with slice images. That is, the image forming apparatus 12 may be used as an ordinary image forming apparatus that also performs image formation on the basis of 2D image data rather than an image forming apparatus dedicated to 3D modeling. Furthermore, the post-processing apparatus 14 performs post-processing irrespective of slice image formation processing of the image forming apparatus 12.

The above-described information processing apparatus, 3D modeling system, and program according to the exemplary embodiment are just examples, and it goes without, saying that they can be modified without departing from, the spirit and scope of the invention.

What is claimed is:

1. An information processing apparatus comprising:
   a first output unit that, when an instruction to perform image formation based on 2D image data is received, generates first image formation information for formation of images on respective recording media based on the 2D image data and outputs the generated first image formation information to an image forming apparatus;
   a second output unit that, when an instruction to perform 3D modeling based on 3D data is received, generates plural slice data by slicing the 3D data by plural respective planes, generates second image formation information for formation of a series of slice images on respective recording media based on the plural generated slice data, and outputs the generated second image formation information to the image forming apparatus;

a generation unit that generates a series of control data that allow a post-processing apparatus to perform 3D modeling post-processing on the recording media, based on the plural slice data; and a storing unit that stores the generated series of control data in a memory to output the generated series of control data to the post-processing apparatus after the formation of the series of slice images on the respective recording media by the image forming apparatus.

2. The information processing apparatus according to claim 1, wherein control data for each recording medium include control data that specify a cutting line along which a lamination component is to be cut out from the recording medium and control data that specify a glue application region where glue is to be applied to the recording medium.

3. A 3D modeling system comprising:
the information processing apparatus according to claim 1;
an image forming apparatus that forms images on respective recording media based on the first image formation information or the second image formation information; and
a 3D modeling post-processing apparatus that reads out the series of control data stored in the memory, and performs post-processing for manufacture of a 3D modeled object on plural recording media on which a series of slice images has been formed by the image forming apparatus, according to the read-out series of control data.

4. The 3D modeling system according to claim 3, wherein after formation of all of the series of slice images by the image forming apparatus, the 3D modeling post-processing apparatus acquires a bundle of plural recording media that are stacked in order of formation of the slice images and performs 3D modeling post-processing on the plural recording media while taking out the recording media one by one in order from the top of the bundle.

5. A non-transitory computer readable medium storing a program for causing a computer to function as:
a first output unit that, when an instruction to perform image formation based on 2D image data is received, generates first image formation information for formation of images on respective recording media based on the 2D image data and outputs the generated first image formation information to an image forming apparatus;
a second output unit that, when an instruction to perform 3D modeling based on 3D data is received, generates plural slice data by slicing the 3D data by plural respective planes, generates second image formation information for formation of a series of slice images on respective recording media based on the plural generated slice data, and outputs the generated second image formation information to the image forming apparatus;
a generation unit that generates a series of control data that allow a post-processing apparatus to perform 3D modeling post-processing on the recording media, based on the plural slice data; and
a storing unit that stores the generated series of control data in a memory to output the generated series of control data to the post-processing apparatus after the formation of the series of slice images on the respective recording media by the image forming apparatus.

* * * * *